US006383400B1

(12) United States Patent
Broudic et al.

(10) Patent No.: US 6,383,400 B1
(45) Date of Patent: May 7, 2002

(54) METHOD FOR REDUCING NITRATE AND/OR NITRIC ACID CONCENTRATION IN AN AQUEOUS SOLUTION

(75) Inventors: Jean-Charles Broudic; Philippe Brossard, both of Villeneuve les Avignon (FR); Aleksei Ananiev, Moscow (RU)

(73) Assignees: Commissariat a l'Energie Atomique, Paris (FR); Compagnie Generale des Matieres Nucleaires, Velizy-Villacoublay (FR)

( * ) Notice: Subject to any disclaimer, the term of this patent is extended or adjusted under 35 U.S.C. 154(b) by 0 days.

(21) Appl. No.: 09/720,966
(22) PCT Filed: Jul. 27, 1999
(86) PCT No.: PCT/FR99/01840
 § 371 Date: Jan. 22, 2001
 § 102(e) Date: Jan. 22, 2001
(87) PCT Pub. No.: WO00/06503
 PCT Pub. Date: Feb. 10, 2000

(30) Foreign Application Priority Data

Jul. 28, 1998 (FR) .............................. 98 09643

(51) Int. Cl.⁷ ................................................ C02F 1/02
(52) U.S. Cl. ...................................... 210/766; 210/903
(58) Field of Search ................................. 210/766, 903

(56) References Cited

U.S. PATENT DOCUMENTS 3,673,086 A * 6/1972 Drobnik
5,118,447 A * 6/1992 Cox et al.

FOREIGN PATENT DOCUMENTS

| DE | 1935273 | 1/1971 |
| DE | 4437864 | 4/1996 |
| EP | 0196597 | 10/1986 |

OTHER PUBLICATIONS

L.Cecille and S. Halaszovich, "Denitration of Radioactive Liquid Waste," p. 2, lines 3–7; p. 4, lines 21, 22; p 4, lines 30–31, Commission of the European Communities, 1986.
Longstaff, J.U.L. and Singer J., "The Kinetics of Oxidation by Nitrous Acid and Nitric Acid," p. 4, lines 30, 31, J. Chem. Soc., 1954.

* cited by examiner

Primary Examiner—Betsey Morrison Hoey
(74) Attorney, Agent, or Firm—Burns, Doane Swecker & Mathis LLP

(57) ABSTRACT

The present invention relates to a process to reduce the nitrate and/or nitric acid concentration of an aqueous solution—referred to as a denitration process—by means of a reaction with formic acid or formol wherein said reaction is carried out in heterogeneous catalysis. The solutions treated may for example be produced by processes related to nuclear fuel cycles such as the nitric acid solutions used in the treatment of radioactive waste or explosive substance manufacturing processes or surface treatment processes.

16 Claims, No Drawings

METHOD FOR REDUCING NITRATE AND/OR NITRIC ACID CONCENTRATION IN AN AQUEOUS SOLUTION

"This application is a national phase of PCT/FR99/01840 which was filed on Jul. 27, 1999, and was not published in English."

The present invention relates to a process to reduce the nitrate and/or nitric acid concentration of an aqueous solution—referred to as a denitration process—by means of a reaction with formic acid or formol.

More specifically, the present invention relates to a process used to reduce the nitrate and/or nitric acid concentration or eliminate nitrates and/or nitric acid from aqueous effluents produced by various processes implemented equally well in the nuclear industry as in other industries, by means of a catalysed reaction with formic acid or formol.

Therefore, the technical field of the invention may be defined generally as that of the treatment of aqueous solutions, particularly aqueous industrial effluents, with a view to reducing their nitrate and/or nitric acid concentration, or eliminating said substances completely.

Of the various existing denitration processes, the chemical destruction of nitrates and/or nitric acid by means of a reaction with formic acid is the most frequently used due to its efficiency, simplicity and profitability.

The reaction of formic acid and nitric acid is for example widely used in the field of the nuclear industry by the denitration of the nitric acid solutions used in the treatment of radioactive waste.

On this subject, it is possible to refer to the work "Denitration of radioactive liquid waste" edited by L. Cecille and S. Halaszovich—Radioactive Waste Management Series; Graham and Trotman Ltd; Commission of the European Communities.

The chemistry of the homogeneous phase interaction between nitric acid and formic acid has been studied in detail and denitration installations have been developed and installed.

It has been demonstrated that denitration with formic acid is a very complex chemical process, which depends on numerous factors such as acidity, temperature, reaction mixture composition, pressure, order in which the reagents are mixed, reaction vessel's shape, etc.

The fundamental chemical reactions which take place during denitration with formic acid are as follows depending on the concentration of each of the two essential reagents:

nitric acid concentration greater than 8M $$2HNO_3 + HCOOH \rightarrow 2NO_2 + CO_2 + 2H_2O \quad (1)$$

nitric acid concentration between 0.5 and 8 M:

$$2HNO_3 + 2HCOOH \rightarrow NO + NO_2 + 2CO_2 + 3H_2O \quad (2)$$

$$2HNO_3 + 3HCOOH \rightarrow 2NO + 3CO_2 + 4H_2O \quad (3)$$

slight excess of HCOOH $$2HNO_3 + 4HCOOH \rightarrow N_2O + 4CO_2 + 5H_2O \quad (4)$$

significant excess of HCOOH $$2HNO_3 + 5HCOOH \rightarrow N_2 + 5CO_2 + 6H_2O \quad (5)$$

It is important to note that the denitration operations may also be carried out using formol to replace formic acid.

In this case, the reaction mechanism using formic acid as an intermediate compound is specified below.

The reactions involved during the denitration of nitric acid with formol, as a function of the nitric acid concentrations are as follows:

for nitric acid concentrations greater than 8M:

$$4HNO_3 + HCHO \rightarrow 4NO_2 + CO_2 + 3H_2O \quad (6)$$

for nitric acid concentrations between 0.5 and 8M:

$$4HNO_3 + 2HCHO \rightarrow 2NO_2 + 2NO + 2CO_2 + 4H_2O \quad (7)$$

$$4HNO_3 + 3HCHO \rightarrow 4NO + 3CO_2 + 5H_2O \quad (8)$$

in the case of a moderate excess of formol:

$$4HNO_3 + 4HCHO \rightarrow 2N_2O + 4CO_2 + 6H_2O \quad (9)$$

in the case of large excesses of formol:

$$4HNO_3 + 5HCHO \rightarrow 2N_2 + 5CO_2 + 7H_2O \quad (10)$$

Therefore, it is observed that, in the non-catalysed denitration reaction mechanism with formol, formol is first oxidised into formic acid by nitric acid and then formic acid is oxidised by nitric acid into carbon dioxide.

The homogeneous phase oxidation mechanism of HCOOH with $HNO_3$ was studied in the document by LONGSTAFF J. U. L. and SINGER K., J.Chem.Soc, 1954, p 2604–2617, on the basis of the overall kinetic analysis of the reaction.

It was demonstrated that formic acid does not react directly with nitric acid but reacts simultaneously with nitrous acid or with $NO^+$ which are present at equilibrium with nitric acid $HNO_3$. According to this mechanism, the role of $HNO_3$ is to oxidise the intermediate products of the reaction. These secondary reactions result in the formation of $HNO_2$, either directly, or by the series of equilibria described in the document by ABEL E., SCHMID H; WEISS J.; Z. Phys. Chem 1930, V. 147 [A], p. 69, according to the reaction:

$$HNO_3 + HNO_2 \leftrightarrows N_2O_4 + H_2O \leftrightarrows 2NO_2 + H_2O \quad (11)$$

In other words, the denitration reaction is fundamentally autocatalytic in nature.

One of the main characteristics of this type of reaction is the existence of an induction period during which nitrous acid $HNO_2$ accumulates in the solution, up to a threshold concentration from which the reaction develops rapidly.

The two elements shown above, i.e. the induction period and the autocatalytic breakdown of nitric acid are the essential causes of the problems involved in this process, which require measures to ensure safety, as described in pages 51 to 57 of the work by L. CECILLE and S. HALASZOVICH already mentioned above.

The main measures taken to ensure the start of the reaction and enable it to be carried out uninterruptedly are the addition of sodium nitrite $NaNO_2$, the maintenance of the solution at boiling point, and rigorous monitoring of the reagent flow rate. The essential aim is in fact to prevent the accumulation of formic acid in the reaction mixture as described in page 168 to 177 of the work by L. CECILLE and S. HALASZOVICH mentioned above.

Failure to apply any of these measures may result, under certain conditions, to the violent, practically uncontrollable, development of the process and may induce excess pressure in the denitration apparatus and the formation of explosive gaseous mixtures.

In addition, the presence, even at trace levels, of anti-nitrous agents such as hydrazine, urea or others in the solution may prevent the reaction from starting in a satisfactory manner and induce a hazardous accumulation of formic acid in the reaction mixture, which then induces the sudden and violent development of the process.

Therefore, there is a need for a process to reduce the nitric acid and/or nitrate concentration of an aqueous solution, by means of formic acid or formol, which offers, among other things, safety and improved simplicity compared to the processes of the prior art, which is governed by perfectly controlled kinetics and makes it possible to achieve excellent denitration yields—up to the complete elimination of nitrates and/or nitric acid—irrespective of the solutions treated.

In other words, there is a need for a process to reduce the nitric acid and/or nitrate concentration of an aqueous solution, by means of formic acid or formol which does not have the shortcomings, limitations, defects and disadvantages of the processes of the prior art, in particular the homogeneous denitration process, and which solves the problems involved with these processes, and in particular the problems involved with the homogeneous denitration process.

The purpose of the present invention is to provide a process which, among other things, meets these needs.

This purpose and others are achieved according to the invention by a process to reduce the nitric acid and/or nitrate concentration of an aqueous solution, by means of formic acid or formol, wherein said reaction is carried out in heterogeneous catalysis, said process comprising the following successive steps:

a) Placing of the aqueous solution to be treated in contact with a catalyst;

b) Heating of the reaction mixture obtained—from step a)—to a predetermined temperature, in the range from 60° C. to 100° C.;

c) Addition of formic acid or formol to the reaction mixture;

d) Maintaining the reaction mixture at said temperature for a sufficient time to reach the required final nitric acid and/or nitrate concentration.

In the entire disclosure of the present invention, formic acid is referred to most of the time, but, naturally, the indications in relation to formic acid may also be applied to formol possibly with slight adaptations accounting in particular for the denitration reaction mechanism of nitric acid with formol described above.

The process according to the invention, based on the principle of heterogeneous catalysis of the reaction between nitric acid and formic acid (or formol) shows a simplicity and improved safety with reference to the processes of the prior art, particularly with reference to the homogeneous denitration process.

Indeed, according to the invention, it was demonstrated that, surprisingly, in the presence of a heterogeneous catalyst, the reaction between nitric acid and formic acid started, unlike the processes of the prior art, with no induction period at a predetermined temperature, for all nitrate and/or nitric acid concentrations.

This temperature may easily be determined by a limited number of tests by those skilled in the art particularly according to the catalyst used.

The elimination of the induction period results in a significant improvement of the safety of the process.

The kinetics of the reaction which essentially depend on the temperature are perfectly mastered and controlled and eliminate any possibility of a runaway reaction.

For this reason, it is not necessary, to ensure the safety of the process, as was the case in the prior art, to use rigorous monitoring measures of all the parameters of the process, such as the reagent flow rate, etc. In addition, the addition of sodium nitrite to ensure the start of the process may be eliminated, since, under the conditions of the process according to the invention, the reaction is ensured to be started and carried out according to perfectly controlled kinetics smoothly with no runaway reactions.

The elimination of the addition of $NaNO_2$ contributes to the simplification of the process.

In addition, the process according to the invention results in a significant decrease in the acidity and nitrate concentration, or even the complete elimination of said substances, by conversion into gaseous nitrogen oxides and carbon dioxide that can be easily discharged and/or separated from the solution and do not generate any explosive risk due to the complete absence of hydrogen in the gases produced, while nitrates are in excess.

It is also important to note that the decrease in the acidity takes place without the use of any basic reagents which would generate effluents that are difficult to treat.

Finally, the process according to the invention offers the advantage of operating at lower temperatures than the homogeneous denitration process and therefore requiring a lower energy consumption.

The process according to the invention involves heating the reaction mixture to a temperature generally in the range from 60 to 100° C. to ensure that the reaction is started correctly.

Such a temperature, in the presence of catalyst, ensures that the denitration reaction starts for all nitrate and/or nitric acid concentrations with no induction period.

If the reaction is carried out at lower temperatures, the start of the reaction may be delayed and thus result in the appearance of an induction period which is specifically to be avoided in the process according to the invention. A preferred temperature range is 70 to 80° C.

According to one of the particularly advantageous aspects of the invention, the reaction between nitric acid and formic acid starts with no induction period and is performed even in the presence, in the solution to be treated, of "anti-nitrite" or "anti-nitrous" agents such as urea and hydrazine, however, the rate of the process slows down markedly.

Once said agents are entirely destroyed, the reaction accelerates but without the progression of the process resulting in a violent reaction.

The initial nitrate and/or nitric acid concentration of the aqueous solution treated may vary between wide limits; indeed, one of the advantages of the process according to the invention is the possibility to implement it at any initial nitric acid and/or nitrate concentrations, whether said concentrations are "low" or "high".

Therefore, the nitrate concentration of the aqueous solution is generally 0.5 to 8 mol/l, and the nitric acid concentration of the aqueous solution is generally 0.1 to 8 mol/l.

The catalyst used in the process according to the invention is generally a solid catalyst chosen from active carbons, the catalysts comprising a solid substrate on which at least one noble metal generally chosen from platinum, osmium, palladium, ruthenium, rhodium and iridium is dispersed; platinum is preferred.

The solid substrate is generally chosen from the mineral or organic substrates resistant to solubilisation in nitric medium such as metal or non-metal oxides and organic resins.

The oxides include silica $SiO_2$, alumina $Al_2O_3$, titanium oxide $TiO_2$ and their mixtures and zeolites.

The organic resins include vinylpyridinium-based polymers.

The preferred catalyst is platinum catalyst on silica.

The content of transition metal by weight generally represents 1 to 10% of the substrate.

The catalyst may come in any form, for example discrete particles, a solid block, granules, powders, but it also generally comes in the form of a powder of a grain size of 0.1 to 2 mm.

The proportion of solid catalyst with reference to the volume of the solution to be treated S/L is generally greater than or equal to 1/50 kg/l.

Indeed, if this proportion was less than 1/50 kg/l, this could possibly delay the reaction and result in the appearance of an induction period.

Finally, it is important to note that, according to one of the additional advantages of the invention, no regeneration of the catalyst, for example, of the platinum catalyst on substrate is generally required.

Formic acid is added according to the stoechiometry of the reaction.

The quantity of formic acid required is generally 1 to 1.5 moles per mole of nitrates and/or nitric acid to be broken down present in the solution to be treated, according to the composition of the initial solution and the degree of denitration required.

The analysis of the constituents in liquid phase and in the gases has resulted in the proposal of the following overall mechanism:

$$2HNO_3 + 2HCOOH \rightarrow 2CO_2 + 3H_2O + NO_2 + NO$$

$$2HNO_3 + 3HCOOH \rightarrow 3CO_2 + 4H_2O + 2NO$$

$$2HNO_3 + 4HCOOH \rightarrow 4CO_2 + 5H_2O + N_2O$$

The contribution of each reaction is defined by the acidity and the HCOOH concentration.

The quantity of formic acid required may be added gradually, in other words, in increments or "tankfuls", or in one go if, for example, a high level of denitration is not required.

The time during which the above-mentioned temperature is maintained, during step d), which is referred to as the holding time for a continuous process, is variable as a function particularly of the operating conditions, such as the quantity of product, temperature, type of catalyst and required result, but it can easily be determined by those skilled in the art. During this time, the heating conditions are kept constant.

This time is defined by the required degree of denitration and essentially depends on the predetermined temperature and the required degree of denitration and the acidity, nitrate and/or nitric acid concentration and the formic acid concentration.

This time is defined as being of a sufficient duration to reach the required final nitric acid and/or nitrate concentration.

The process according to the invention makes it possibly advantageously to obtain a high level of denitration after a relatively short time.

It is possible, with the process according to the invention, if required, to eliminate nitrates and/or nitric acid completely.

If complete elimination of nitrates and/or nitric acid is not required or necessary, the process according to the invention could make it possible to reduce concentrations to values of 0.1 to 6N for nitric acid and 0.1 to 3M for nitrates which corresponds to a reduction of said concentration by a factor of 1 to 10 with reference to the initial solution.

According to an alternative of the process according to the invention, it is possible to reverse the order of steps a) and b) consisting of heating the reaction mixture to a predetermined temperature and placing in contact with a catalyst.

The process according to the invention may also comprise a preliminary step consisting of determining the initial acidity and nitrate concentration of the solution, which makes it possible to define the parameters of the process beforehand.

The process according to the invention may be used in continuous mode or in batch mode.

When the process is used in batch mode, the reaction mixture must preferentially be stirred, preferentially continually.

Said stirring may be performed by any known means, for example by mechanical stirring and/or by gas bubbling.

When gas bubbling stirring is used, it is thus possible to control the reaction rate by adjusting the bubbling gas flow rate.

An increase in the bubbling gas flow rate induces a decrease in the reaction rate, which induces the extraction of intermediate gaseous products which contribute to the denitration process.

The process according to the invention applies to the treatment of any solution wherein it is necessary to reduce the nitrate and/or nitric acid content to complete elimination.

The solutions are for example aqueous effluents from any type of industry and agriculture, urban waste water, etc.

Said solutions may for example be produced by processes related to nuclear fuel cycles, such as the nitric acid solutions used in the treatment of radioactive waste or explosive material manufacturing processes or surface treatment processes.

The invention's other characteristics and advantages will be seen more clearly upon reading the following description which is given as an illustration and is not restrictive.

According to the invention, a catalytic substrate, which may be prepared in the following way in the case of silica impregnated with platinum, is used.

Naturally, this process may also be used or adapted for the preparation of catalyst composed of an oxide or organic resin resistant to solubilisation in nitric medium and impregnated with a noble metal.

CATALYST PREPARATION

A 1% Pt catalyst (actual catalyst) was prepared on $SiO_2$ (catalytic substrate) as follows:

A quantity of $SiO_2$ of grain size 0.5–1.0 mm (supplier KSK) is washed in a column with an $HNO_3$ solution (3 mol/l) at approximately 60° C. until the $Fe^{3+}$ detection is negative ($NH_4SCN$ test), and then with twice-distilled water. The silica is then dried in an oven and a calculated volume of $H_2PtCl_6$ solution is added to a weighed portion of $SiO_2$ that is approximately 1.2 ml of liquid for 1 mg of substrate. The mixture is mixed thoroughly and dried at 120° C. The Pt is reduced to the metal state by a hydrazine hydrate solution. The catalyst is poured into the boiling solution at a rate of 1–2 mol/l with mechanical stirring. After a 30 minute period to complete the reduction, the catalyst is separated on a glass filter, washed with $HNO_3$ (3 mol/l) at approximately 60° C. and then with water and dried at 120° C. for 24 hours.

The nitric acid and/or nitrate elimination reaction according to the invention (denitration reaction) is then performed according to the following procedure:

DENITRATION PROCEDURE

The denitration reaction is carried out in a total reflux thermostatically controlled glass reaction vessel. The weighed fraction of catalyst is placed in the reaction vessel with a measured volume of nitric acid of known concentration. So as to remove the traces of nitrous acid initially present at equilibrium with $HNO_3$, nitrogen bubbling is established for 30 minutes. Then, an aliquot part of concentrated HCOOH is introduced into the reaction vessel. Samples are periodically removed for analyses.

The actual HCOOH and $HNO_3$ concentrations were evaluated simultaneously by acidimetry using a Metrohm 682 Titroprocessor unit using calibrated NaOH solutions.

Preliminary experiments demonstrated that the limit of detection of the analysis of formic acid using this method is approximately 0.05 mol/l HCOOH in 8 mol/l $HNO_3$.

The uncertainty of this measurement in the range of concentrations studied which is 0 to 6 mol/l is of the order of $5.10^{-2}$ mol/l.

The analysis of the gases generated during the catalytic denitration reaction is performed using IR spectroscopy and mass spectroscopy methods. For the qualification tests, a Perkin Elmer® 2000 FT-IR IR spectrometer and a Balzers® QMS-200 mass spectrometer were connected in series to the reaction cell, the nitrogen being used as the cleaning gas, the gas flow rate being controlled by an electronic flow meter. The spectra were recorded as a function of time.

The following examples produced with the catalyst and according to the procedure described above illustrate the process according to the invention.

EXAMPLE 1

This example, given as a comparison, describes a denitration process performed without a catalyst according to the prior art. 50 ml of $HNO_3$ (3.2 mol/l) were placed in the reaction vessel, thermostatically controlled at 70° C. Then, 2.0 ml of HCOOH (28 mol/l) were added and the mixture was stirred. The initial concentrations assayed were: $[HNO_3]_0$=3.08 mol/l, $[HCOOH]_0$=1.08 mol/l. 1.0 ml aliquots were periodically sampled for analyses. The measurements of the actual nitric and formic acid concentration demonstrated that the denitration started after an induction period of approximately 25 minutes. After 120 minutes of reaction, the concentrations were measured: $[HNO_3]$=2.58 mol/l; $[HCOOH]$=0.40 mol/l which corresponds to a HCOOH consumption of 1.35 mole per mole of $HNO_3$.

EXAMPLE 2

This example describes a denitration process performed with a heterogeneous catalyst according to the invention. The condition used are exactly the same as those of example 1, the only difference being that the reaction is conducted in the presence of a catalyst, which is the catalyst prepared as described above.

50 ml of $HNO_3$ (3.2 mol/l) were placed in the reaction vessel thermostatically controlled at 70° C. containing 2.0 g of catalyst. Then, 2.0 ml of HCOOH (28 mol/l) were added. The reaction mixture was stirred by nitrogen bubbling at a flow rate of 200 ml/min. The initial concentrations assayed were: $[HNO_3]_0$=3.08 mol/l, $[HCOOH]_0$=1.08 mol/l. The mass of catalyst/volume of solution ratio was 1/25 kg/l. 1.0 ml aliquots were periodically sampled for analyses. The denitration started immediately with no induction period. After 120 minutes of reaction, the concentrations were measured: $[HNO_3]$=2.38 mol/l; $[HCOOH]$=0.12 mol/l which corresponds to a HCOOH consumption of 1.37 mole per mole of $HNO_3$.

EXAMPLE 3

This example demonstrates that the process according to the present invention makes it possible to obtain denitration at a low initial nitric acid concentration.

50 ml of $HNO_3$ (0.96 mol/l) were placed in the reaction vessel thermostatically controlled at 80° C. containing 5.0 g of catalyst. Then, 1.0 ml of HCOOH (28 mol/l) was added. The reaction mixture was stirred by nitrogen bubbling at a flow rate of 200 ml/min. The initial concentrations assayed were: $[HNO_3]_0$=0.92; $[HCOOH]_0$=1.08 mol/l. The mass of catalyst/volume of solution ratio S/L was 1/10 kg/l. 1.0 ml aliquots were periodically sampled for analyses. After 120 minutes of reaction, the concentrations were measured: $[HNO_3]$=0.30 mol/l; $[HCOOH]$=0.16 mol/l. The HCOOH consumption is 1.49 mole per mole of $HNO_3$.

EXAMPLE 4

This example demonstrates that the process according to the present invention makes it possible to obtain denitration at a high initial nitric acid concentration.

200 ml of $HNO_3$ (8 mol/l) were placed in the reaction vessel thermostatically controlled at 80° C. containing 10 g of catalyst. 60 ml of HCOOH (28 mol/l) were added in 5 ml proportions in 15 minutes. The reaction mixture was stirred by nitrogen bubbling at a flow rate of 200 ml/min. The denitration started immediately with no induction period. After 120 minutes of reaction, the concentrations were measured: $[HNO_3]$=1.49 mol/l; $[HCOOH]$=0.07 mol/l. The HCOOH consumption is 1.39 mole per mole of $HNO_3$.

EXAMPLE 5

This example demonstrates that the process according to the present invention makes it possible to obtain a high level of denitration.

50 ml of HCOOH (4.4 mol/l) were placed in the reaction vessel thermostatically controlled at 80° C. containing 5 g of catalyst. 3 ml of $HNO_3$ (15.5 mol/l) were added. The reaction mixture was stirred by nitrogen bubbling at a flow rate of 50 ml/min. The initial concentrations assayed were: $[HNO_3]_0$=0.9; $[HCOOH]_0$=4.15 mol/l. The mass of catalyst/volume of solution ratio S/L was 1/10 kg/l. 1.0 ml aliquots were periodically sampled for analyses. The denitration started immediately with no induction period. After 300 minutes of reaction, the concentrations were measured: $[HCOOH]$=2.08 mol/l; nitric acid was not detected. The HCOOH consumption is 2 moles per mole of $HNO_3$.

The above examples demonstrate that the process according to the invention makes it possible, simply and with a high level of safety, to perform even complete denitration of solutions with very variable nitrate and nitric acid contents.

The comparison of examples 1 and 2 shows that the catalyst makes it possible, firstly, to eliminate the induction period and, secondly, to achieve higher denitration levels than with homogeneous denitration under identical temperature conditions.

What is claimed is:

1. Process to reduce the nitric acid and/or nitrate concentration of an aqueous solution, by means of a reaction with formic acid or formol, wherein said reaction is carried out in heterogeneous catalysis, said process comprising the following successive steps:

a) placing of the aqueous solution to be treated in contact with a catalyst;

b) heating of the reaction mixture obtained in this way to a predetermined temperature, in the range from 60° C. to 100° C.;

c) addition of formic acid or formol to the reaction mixture;

d) maintaining the reaction mixture at said temperature for a sufficient time to reach the required final nitric acid and/or nitrate concentration.

2. Process according to claim 1 wherein said temperature is in the range from 70 to 80° C.

3. Process according to claim 1 wherein the aqueous solution to be treated also contains anti-nitrous agents.

4. Process according to claim 1 wherein the nitrate concentration of the aqueous solution is 0.5 to 8 mol/l and the nitric acid concentration is 0.1 to 8 mol/l.

5. Process according to claim 1 wherein the catalyst is a solid catalyst chosen from active carbons, and the catalysts comprising a solid substrate on which at least one noble metal is dispersed.

6. Process according to claim 5 wherein said at least one noble metal is chosen from platinum, osmium, palladium, ruthenium, rhodium and iridium.

7. Process according to claim 5 wherein the solid substrate is chosen from metal or non-metal oxides and organic resins.

8. Process according to claim 1 wherein the proportion of solid catalyst with reference to the volume of solution to be treated is greater than or equal to 1/50 kg/l.

9. Process according to claim 8 wherein the proportion of solid catalyst with reference to the volume of solution to be treated is greater than or equal to 1/50 to 1/10 kg/l.

10. Process according to claim 1 wherein the quantity of formic acid added is 1 to 1.5 moles per mole of nitrates.

11. Process according to claim 1 also comprising a preliminary step consisting of determining the initial acidity and nitrate concentration of the solution.

12. Process according to claim 1 wherein steps a) and b) are inverted.

13. Process according to claim 12 implemented in batch or continuous mode.

14. Process according to claim 1 implemented in batch or continuous mode.

15. Process according to claim 14 wherein the reaction mixture is stirred by mechanical stirring and/or gas bubbling.

16. Process according to claim 15 wherein the reaction rate is controlled by adjusting the bubbling gas flow rate.

* * * * *